United States Patent [19]

Engel et al.

[11] Patent Number: 4,646,319

[45] Date of Patent: Feb. 24, 1987

[54] BIDIRECTIONAL BUS COUPLER PRESENTING PEAK IMPEDANCE AT CARRIER FREQUENCY

[75] Inventors: Joseph C. Engel; Dirk J. Boomgaard, both of Monroeville; Leonard C. Vercellotti, Oakmont, all of Pa.

[73] Assignee: Westinghouse Electric Corp., Pittsburgh, Pa.

[21] Appl. No.: 706,079

[22] Filed: Feb. 27, 1985

[51] Int. Cl.[4] .............................................. H04L 5/14
[52] U.S. Cl. ......................................... 375/7; 375/36; 370/32
[58] Field of Search .......................... 375/7, 8, 36, 68; 178/63 F, 69 C, 71 R; 370/32; 333/177

[56] References Cited

U.S. PATENT DOCUMENTS

| | | | |
|---|---|---|---|
| 1,970,423 | 8/1934 | Frink | 370/32 |
| 1,970,424 | 8/1934 | Frink | 370/32 |
| 3,875,332 | 4/1975 | Fletcher et al. | 375/36 |
| 3,924,068 | 12/1975 | Fletcher et al. | 178/69 C |
| 4,038,601 | 7/1977 | Laborie et al. | 375/36 |
| 4,254,501 | 3/1981 | Griffith et al. | 375/36 |

Primary Examiner—Robert L. Griffin
Assistant Examiner—Raymond C. Glenny
Attorney, Agent, or Firm—M. J. Moran

[57] ABSTRACT

A bidirectional coupling circuit is provided for carrier based communication and control networks in which a coupling transformer is employed having relatively decoupled primary and secondary windings which are each tuned to the carrier frequency. Separate secondary windings are wound on the same core leg, one of these secondary windings being employed as a transmitter winding which is referenced to a positive supply voltage and the other winding being employed as a receiver winding which is referenced to ground. The coupling transformer is arranged to have a relatively high input impedance at the carrier frequency but due to series resonant effects has a relatively low impedance for undesired signals on either side of the carrier frequency. An operational amplifier is connected to the receiver winding to provide high gain amplification for a signal received from the common network power line without loading the other windings of the transformer. A transistor or FET is connected in series with the transmitter secondary winding to a positive voltage supply so that a relatively high amplitude transmitter signal is produced on the common power line.

32 Claims, 14 Drawing Figures

RECEIVER CHARACTERISTIC

INPUT IMPEDANCE CHARACTERISTIC

PI EQUIVALENT

T EQUIVALENT

REDRAWN T EQUIVALENT

T EQUIVALENT AT CARRIER FREQUENCY

TRANSMITTER EQUIVALENT CIRCUIT

BIDIRECTIONAL BUS COUPLER PRESENTING PEAK IMPEDANCE AT CARRIER FREQUENCY

CROSS REFERENCE TO RELATED APPLICATIONS

The invention disclosed herein relates to two-way communication and control systems. The following four commonly assigned U.S. patent applications were all filed in the U.S. Patent and Trademark Office on June 28, 1984 and relate to such communication and control systems: Ser. No. 625,747 filed by William R. Verbanets and entitled Multipurpose Digital IC for Communication and Control Network; Ser. No. 625,863 filed by William R. Verbanets and Theodore H. York and entitled Improved Digital IC-Microcomputer Interface; Ser. No. 625,862 filed by Leonard C. Vercellotti and William R. Verbanets and entitled Low Error Rate Digital Demodulator; and Ser. No. 625,864 filed by Leonard C. Vercellotti, William R. Verbanets and Theodore H. York entitled Digital Message Format for Two-Way Communication and Control Network. In addition, the application Ser. No. 736,171 filed by Gregory B. Fortune and James S. Gleba on May 20, 1985 and entitled Multi-Function Load Controller For Carrier Load Control Subsystem is directed generally to a carrier based bidirectional control system.

BACKGROUND OF THE INVENTION

A. Field of the Invention

The present invention relates generally to communication and control networks by means of which a large number of remotely positioned controllable devices, such as circuit breakers, motor overload relays, lighting systems, and the like, may be controlled from a central or master controller over a common network line. Specifically, the present invention relates to a coupling circuit which may be employed at each remote station and at the master controller to provide bidirectional coupling to the common network line and includes amplification and limiting of a received signal. While this coupling circuit is of general application, it is particularly suitable for and will be described in connection with a low cost, multipurpose, hardware-based digital IC which is used as the basic building block in the communication and control system described in the above identified cross referenced applications. The disclosure of these cross referenced applications is hereby incorporated herein. In these cross referenced applications communication over the common network line is accomplished by means of on-off keyed carrier signals which are impressed on the common network line in a specific message format or photocol, as described in detail in said cross referenced application.

B. Description of the Prior Art

Various types of coupling circuits have heretofore been employed in communication and control systems of the prior art. Many of the prior art communication and control systems have been undirectional in nature and the coupling circuit at each remote station provides only for the reception of signals from the central controller. Such undirectional coupling circuits are shown, for example, in Eichelberger et al U.S. Pat. No. 4,091,361, Miller et al U.S. Pat. No. 4,167,786, Eichelberger et al U.S. Pat. No. 4,168,531 and Eichelberger et al U.S. Pat. No. 4,213,182. Only Eichelberger et al U.S. Pat. No. 4,091,361 involves the reception of frequency shift keyed carrier signals and this patent makes no provision for the transmission of signals from a remote station to the common network line.

Other communication and control systems have provided separate remotely located transmitter units which are associated with different groups of remote receiver-decoder stations, each of said remote transmitters being connected to a common coupler located at the central controller. Examples of each communication and control systems, which do not involve bidirectional coupling circuits associated with each remote station, are found in Feiker U.S. Pat. Nos. 4,173,754 and 4,185,272. While the Feiker patents contemplate the use of frequency shift keyed carrier signals, coupling from the separate remote transmitters is performed by means of a common directional coupler located at the central controller.

Still other communication and control systems have employed bidirectional coupling circuits for microprocessor based remote stations which are employed to control a number of mechanically latchable relays which are hard wired to each remote station. Examples of such communication and control systems are found in Miller et al U.S. Pat. Nos. 4,367,414 and 4,396,844. In these systems the transmission of signals over the common network line is accomplished by changing the impedance level on the line, either at the central controller or at one of the remotely located microprocessor based remote stations.

In the above identified Fortune et al application a carrier based bidirectional control system is disclosed which employs capacitive coupling to and from the power line, the received signal being amplified in a preamplifier circuit prior to application to a phase lock loop circuit which acts as a carrier demodulator.

When the coupling circuit is employed both to receive a modulated carrier signal from and to transmit a modulated carrier signal to a common network line, it is difficult to provide an arrangement which performs both functions efficiently and without the operation of either function affecting the other function adversely. This is particularly true where the common network line is a conventional AC power line the impedance of which may vary considerably for the high frequency carrier signals. Also, conventional power lines usually have noise and other undesired signals of different frequencies present thereon which can interfere with the transmission of plural bit messages over the power line and cause errors to be produced in one or more bits of a transmitted message. In the case of reception of a modulated carrier signal, the coupling circuit should have high selectively so that only the modulated carrier signal will be selectively amplified and all other signals, including those having frequencies close to the carrier frequency will be rejected. Furthermore, since all of the coupling circuits at remote stations are connected in parallel across the common network line, the impedance of each coupling circuit as seen by the power line should be a maximum at the carrier frequency. However, since reception of signals is most critical at the minimum voltage level of the associated amplifier, the coupling circuit should draw a minimum current at this minimum voltage level so that the highest impedance level is presented to the line for input signals of minimum voltage levels. The associated amplifier should also have high sensitivity so that this minimum voltage level is as low as possible.

In the case of transmission of a modulated carrier signal to the common network line, the maximum value of current should be supplied to the line so that a maximum number of parallel connected remote stations may be supplied with a signal of said minimum voltage level. However, due to the low impedance across the A.C. power line when a large number of remote stations is employed a low driving impedance is required which conflicts with the requirement of a high impedance input for each coupling circuit during reception of modulated carrier signals. In the transmission mode the coupling circuit should also have high efficiency and produce the desired modulated carrier signal on the power line with a minimum of distortion. The coupling circuit should also be capable of operating continuously in the transmission mode with an open circuit or short on the power line.

SUMMARY OF THE INVENTION

It is an object of the present invention to provide a new and improved bidirectional coupling circuit for carrier based communication and control networks which is of low cost, has small physical dimensions and is immune to electrical voltage transients.

It is another object of the present invention to provide a new and improved bidirectional coupling circuit for carrier based communication and control networks which operates in the transmission mode with high output and efficiency so that a large number of controlled devices may be connected to a power line which serves as the common network link for the communication and control system.

It is a further object of the present invention to provide a new and improved bidirectional coupling circuit for carrier based communication and control networks which operates in the receiving mode with high selectivity and sensitivity and has a high input impedance so that a large number of controlled devices may be connected to the common network power line.

It is still a further object of the present invention to provide a new and improved bidirectional coupling circuit for carrier based communication and control networks wherein the competing requirements of high input impedance for the reception of signals and low driving impedance for the transmission of signals are adequately and efficiently resolved so that a large number of controlled devices may be connected to the common network power line.

Briefly considered, the above and further objects of the present invention are achieved by providing an extremely small coupling transformer, preferably occupying a space of a ½ inch cube, which can be mounted on a small circuit board or card together with other components of the coupling circuit and the hardware based digital IC described in the above identified cross referenced applications so that a small communication and control unit, which may be mounted within the housing of relays, motor controllers, lighting panels, wall switch units, and the like, is provided. In the preferred embodiment of the invention, the coupling transformer is constructed from two ferrite cores which are E-shaped and positioned in juxtaposition with a small air gap between the opposed legs thereof, one winding of the coupling transformer being on one outer leg of the E-shaped cores and second and third windings being wound on the other outer leg of the cores. The center leg functions as a magnetic shunt between the primary winding and the two secondary windings which decouples these windings by shunting approximately two-thirds of the primary flux from the secondary windings. Even with only one third of the primary flux reaching the secondary windings, the primary-secondary coupling is relatively tight, or overcoupled due to the ferrite core structure, as compared to the air core arrangement used in conventional broadcast receivers. The response characteristic of the coupling transformer of the present invention is thus double peaked, due to the overcoupling, and the transformer has a relatively high input impedance in the order of 200 ohms, at the carrier frequency. However, at frequencies relatively close to the carrier on either side thereof the coupling transformer has a relatively low input impedance so that it acts as a signal "trap" at these frequencies and absorbs signals whose frequencies are near to the desired carrier frequency.

The two secondary windings are wound on the same core leg and thus are tightly coupled. One of these windings is used as a transmitter winding and is referenced to a positive voltage power supply. The other secondary winding is used as a receiver winding and is referenced to ground. An operational amplifier is connected to the receiver winding and is employed to provide high gain amplification for a signal received from the common network power line without loading the windings of the transformer so that the input impedance of the coupling transformer is relatively high at the carrier frequency. A transistor or FET is connected in series with the transmitter secondary winding to the plus voltage supply so that a relatively high amplitude transmitter signal is produced on the common power line. This combination of a relatively high level of transmitted signal together with the relatively high input impedance of the coupling transformer for reception of signals and the high sensitivity provided by the high gain of the operational amplifier, provides a combination whereby a large number of controlled units (slaves) may be connected to the common power line each of which is capable of transmitting signals to and receiving signals from the other units of the communication and control network.

BRIEF DESCRIPTION OF THE DRAWINGS

The invention, both as to its organization and method of operation, together with further objects and advantages thereof, will best be understood by reference to the following specification taken in connection with the accompanying drawings in which.

DESCRIPTION OF THE PREFERRED EMBODIMENTS

Figure 1:
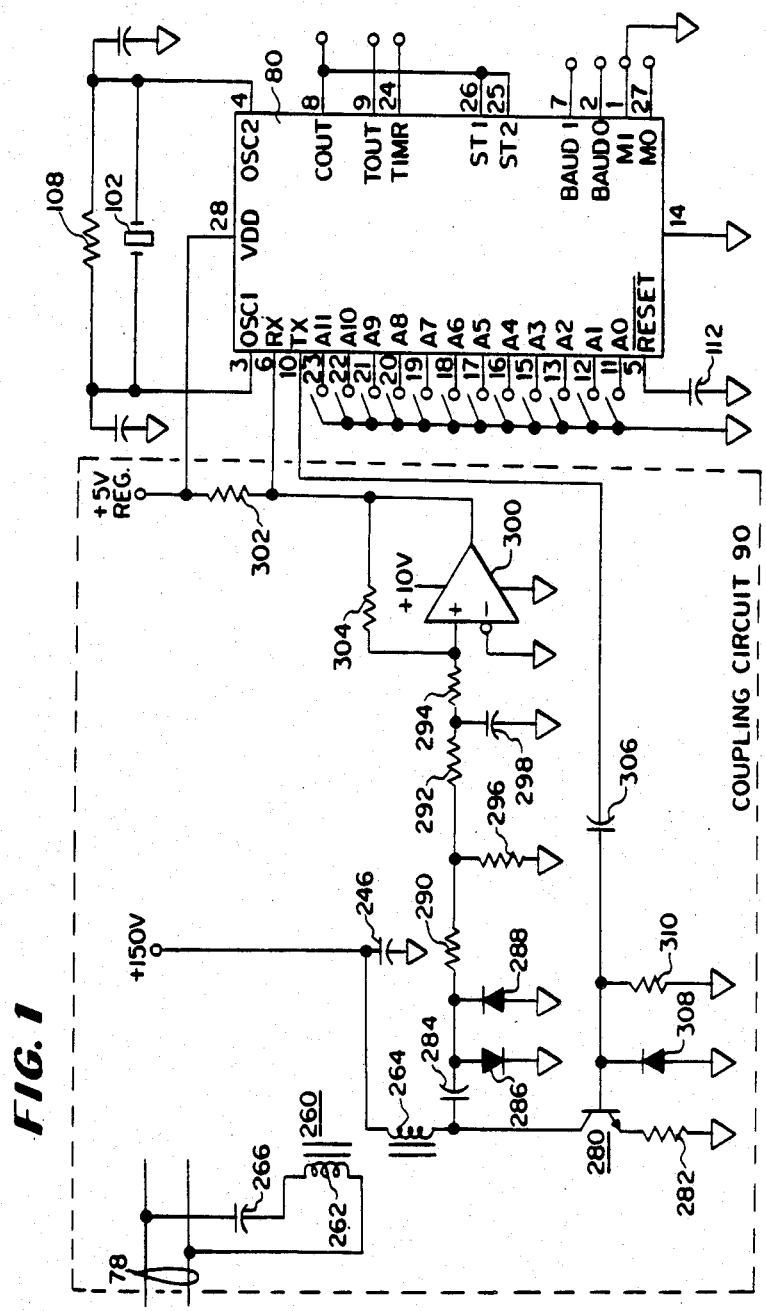
FIG. 1 is a schematic diagram of one embodiment of the coupling circuit of the present invention shown in conjunction with a hardware based digital IC of the type described in the above identified cross referenced applications.
Figure 1A:
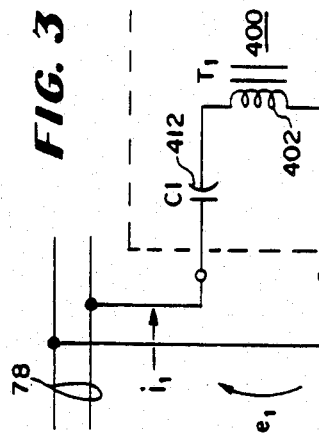
FIG. 1A is a diagram showing the physical construction of the coupling transformer of FIG. 1.

Referring now to the drawings, and more particularly to a first embodiment of the invention shown in FIGS. 1 and 1A thereof, the coupling circuit 90 of the present invention is therein illustrated in connection with a hardware based digital IC 80, the coupling circuit 90 being connected to the power line 78 which serves as the bidirectional link for a communication and control network of the type described in said above identified cross referenced applications. The digital IC 80 is described in detail in any one of the above identified cross referenced applications and reference may be had to any of these copending applications for a detailed description of the device 80. However, for purposes of the present invention, it may be stated that the device 80 is pin configurable to operate either as a stand alone slave, as shown in FIG. 1, or as an expanded mode slave in which the device 80 is employed to establish an interface with an associated microcomputer, or as an expanded mode master, in which the device 80 may be associated with a host computer or other arrangement which acts as the master controller for the communication and control network.

In each of these modes of operation, the device 80 is connected to the power line 78 through the coupling circuit 90, this circuit acting as a transmit-receive unit for the device 80. More specifically, the coupling circuit 90 is arranged to amplify an on-off keyed carrier signal which is impressed upon the common power line 98 from some other unit of the communication and control network, this receive signal being amplified and limited to a level suitable for application to the RX input terminal, pin 6, of the device 80. As described in any of said cross referenced applications, the device 80 is adapted to function properly with an on-off keyed carrier signal of 5 volts amplitude applied to the RX input terminal pin 6. In addition, the coupling circuit 90 is employed as a driver circuit for interconnecting the TX output terminal, pin 10, of the device 80 with the power line 78 and providing a relatively high voltage level signal on the power line 78 in response to the TX output signal developed by the device 80. As described in detail in any of said cross referenced applications, the device 80 is arranged to provide a transmitter output signal on the TX output terminal of five volts amplitude during the transmission-on periods of the on-off keyed carrier signal.

The coupling circuit 90 thus provides bidirectional coupling between the network power line 78 and the digital IC 80 and is tuned to a carrier frequency of 115.2 kHz. The coupling circuit 90 also limits the received signal in both the positive and negative directions to five volts peak to peak before it is applied to the RX input terminal of the device 80. The coupling circuit 90 also couples the transmitter output terminal TX to the power line and can drive a relatively low impedance in the order of 10 ohms at the carrier frequency, when the device 80 is transmitting a message onto the network line 78. In the embodiment of FIG. 1, the coupling circuit 90 provides a signal of 1 volt rms amplitude on the low impedance power line 78.

Considering now in more detail the coupling circuit 90, a coupling transformer 260 is employed to provide bidirectional coupling between the network 78 and the device 80. The transformer 260 includes a primary winding 262 and a secondary winding 264, the primary winding 262 being connected in series with a capacitor 266 across the power line 78. In accordance with an important aspect of the present invention, the two windings 262 and 264 of the transformer 260 are decoupled so as to permit the winding 262 to function as a part of a tuned resonant circuit which includes the capacitor 266, this resonant circuit being tuned to the carrier frequency of 115.2 kHz. More particularly, as shown in FIG. 1A the core structure of the transformer 260 is formed by two sets of opposed E-shaped ferrite core sections 268 and 270 the opposed legs of which are separated by a small air gap. Preferably, these core sections are made of type 814E250/3E2A ferrite material made by the Ferrox Cube Corp. The winding 262 is wound on the opposed outer leg portions 272 of the sections 268 and 270 and the winding 264 is wound on the outer leg sections 274. The windings 262 and 264 are thus decoupled by the magnetic shunt formed by the opposed center legs of the core sections 268 and 270 so as to provide substantial decoupling between these windings. The winding 262 has an inductance of approximately 0.2 millihenries and consists of 100 turns of AWG#36 wire. The winding 264 has an inductance of approximately 7.2 millihenries and consists of 600 turns of AWG#40 wire. The turns ratio between the primary winding 262 and the secondary 264 is thus 1:6. The air gaps between the opposed legs of the core sections 268, 270 are preferably 0.063 inches.

The upper end of the winding 264 is connected to a +150 volt potential which is preferably developed from the power line 78 by a suitable rectifier circuit (not shown), a capacitor 246 being connected across the +150 volt supply for filtering purposes. The bottom end of the winding 264 is connected to the collector of a high voltage NPN transistor 289 the emitter of which is connected to ground through a small resistor 282. Preferably, the transistor 280 is a type MJE 13003 which is manufactured by Motorola Inc. In the alternative, a high voltage FET type IR720 manufactured by International Rectifier Co. may be employed as the transistor 280. The bottom end of the winding 264 is also connected through a capacitor 284 and a pair of reversely connected diodes 286, 288 to ground.

The winding 262 and capacitor 266 of the coupling circuit 90 act as a first resonant circuit which is tuned to the carrier frequency of 115.2 kHz and has a Q of approximately 40. The winding 264 and the capacitor 284 also act as a resonant circuit which is tuned to the carrier frequency. Preferably, the capacitor 266 is a polypropylene 400 V. capacitor having a capacitance of 0.01 microfarads. The capacitor 284 preferably has a value of 270 picofarads. If the signal on the power line 78 has an amplitude of 10 millivolts, for example, a theoretical voltage approximately Q times the input voltage will be developed across the winding 262 i.e. a signal of 400 millivolts amplitude. However, due to the loading effects of the remainder of the circuit a net gain of 4 is provided in the series resonant circuit 262,266. The signal developed across the winding 264 is increased by a factor of 6 due to the turns ratio of the transformer 260, and is coupled through the capacitor 284 to a filter network which includes the series resistors 290, 292, and 294. A shunt resistor 296 is connected between the resistors 290 and 292 and ground and a small capacitor 298, which preferably has a value of 100 picofarads, is connected between the junction of the resistors 292 and 294 and ground.

The output of this filter circuit is supplied to one input of a comparator 300 the other input of which is connected to ground. The comparator 300 provides high gain amplification and limiting of the received signal developed across the secondary winding 264. The comparator 300 may, for example, comprise a commercial type LM393 comparator manufactured by National Semiconductor, Inc. and its output is supplied to the RX pin 6 of the device 80. This output is connected through the resistor 302 to a five volt regulated power supply, energized from the power line 78, which also supplies the device 80 and the comparator 300 with power. A small amount of positive feedback is provided for the comparator 300 by means of the resistor 304 which is connected between the output of the comparator 300 and the plus input terminal thereof, the resistor 304 preferably having a value of 10 megohms. The slight positive feedback provided by the resistor 304 creates a small dead band at the input of the comparator 300 so that a signal of approximately 5 millivolts is required to develop a signal in the output and noise voltages below this level will not be reproduced in the output of the comparator 300. However, when the incoming signal exceeds a five millivolt level it is greatly amplified and limited, due to the extremely high gain of the comparator 300. When a received signal of 40 millivolts apptitude is developed across the winding 264 and is supplied to the input of the comparator 300 an amplified carrier signal of five volts amplitude is developed across the resistor 302 and is applied to the RX input terminal of the device 80.

Considering now the operation of the coupling circuit 90 during the transmission of a message from the device 80 to the network, the modulated carrier signal which is developed on the TX pin 10 of the device 80 is coupled through a capacitor 306 to the base of the transistor 280. This base is also connected through a diode 308 to ground and through a resistor 310 to ground. The transistor 280 is a high voltage NPN transistor so that the collector of this transistor can be connected through the transformer winding 264 to the +150 volt supply. The capacitor 306 is provided to couple the TX output of the device 80 to the base of the transistor 280 because when power is applied to the device 80 the TX output pin 10 assumes a five volt potential which would destroy the transistor 280 if the capacitor 306 were not provided.

The transistor 280 is turned on and off by the modulated carrier signal which is coupled to the base of this transistor through the capacitor 306 and hence develops a voltage of approximately 150 volts across the winding 264 during the carrier on portions of the transmitted message. When the transistor 280 is turned off there is a substantial current being draws through the winding 264, which cannot change instantaneously, so that a large back EMF pulse is also developed across the winding 264. The reversely connected diodes 286 and 288 protect the receiver input circuitry from both polarities of the high voltage pulses which are developed across the winding 264 during the transmit mode. However, it will be understood that the diodes 286 and 288 do not conduct for small amplitude signals and hence the received carrier signal may be coupled through the capacitor 284 to the comparator 300 without interference from the diodes 286 and 288.

The large carrier voltage developed across the winding 264 is stepped down in the transformer 260 and drives the power line 232 so that the 33 bit message developed by the device 80 may be transmitted to a large number of similar devices 80 which may be connected to the common network power line through coupling circuits similar to the coupling circuit 90. At the carrier frequency the power line 232, with a large number of coupling circuits 90 connected thereto, will have a very low impedance of approximately 10 ohms whereas the reactance of the capacitor 266 is about 300 ohms at the carrier frequency. Accordingly, the power line is essentially driven in a current mode.

It will be understood that the coupling circuit 90 can be of very small physical size due to the fact that the coupling transformer 260 is relatively small. The coupling circuit 90, the device 80 and the circuitry necessary to actuate an associated relay may all be located on a small circuit board which can be mounted within the housing of the relay so as to provide an addressable relay in a simple and economical manner. Furthermore, existing relays can be converted into addressable relays by simply installing such a board and making appropriate connections to the power line.

Figure 2:
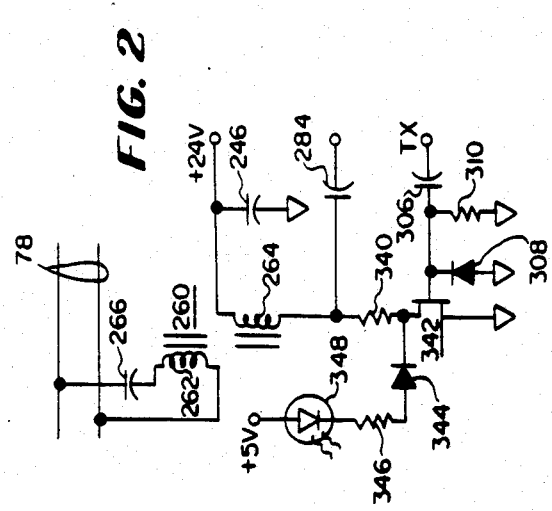
FIG. 2 is a schematic diagram of an alternative embodiment of the coupling circuit of the present invention.

It will be appreciated that in many instances the controlled device associated with the digital IC 80 will have a low voltage D.C. power supply which is provided for other logic circuits in the controlled device. In such instance, the coupling network of FIG. 1 can be modified as shown in FIG. 2 to operate directly from a low voltage D.C. power source. Referring to this figure, only the portions of the coupling circuit of FIG. 1 are shown which are changed from the arrangement of FIG. 1. Specifically, the upper end of the winding 264 is connected to a +24 volt supply (assumed to be available from the controlled device) and the bottom end of the winding 264 is connected through a resistor 340 to the drain electrode of an FET 342 the source of which is connected to ground. Preferably the FET is a power FET commercial type 2N6660. The gate of the FET 342 is connected to ground through the diode 308 and through the capacitor 306 to the TX terminal of the device 80. The drain of the FET 342 is also coupled through a diode 344 and a resistor 346 to a light emitting diode 348. In the circuit of FIG. 2 the +5 V regulated supply and the comparator 300 are of a suitable commercial type to be energized directly from the +24 V. supply. Since a lower D.C. voltage is available in the circuit of FIG. 2 both of the windings 262 and 264 of the transformer 260 of FIG. 2 have the same number of turns, i.e. 100 turns of AWG #36 wire, and the capacitors 266 and 284 are both 0.01 ufd. capacitors.

In operation, the circuit of FIG. 2 receives an on-off modulated carrier signal from the power line 78 which is coupled through the transformer 260 without step up because both windings 262 and 264 have the same number of turns. The signal developed across the winding 264 is coupled through the capacitor 284 and the input filter and comparator 300, as described in connection with FIG. 1, to the RX terminal of the device 80. In the transmit mode the modulated carrier signal on the TX terminal is supplied through the capacitor 306 to the gate of the FET 342 so as to turn this device on and off which produces a modulated carrier current in the transformer winding 264 which is transmitted to the power line 78. Since the windings 262 and 264 have the same number of turns in the embodiment of FIG. 2 there is no step down of the transmitted signal in passing through the transformer and hence the level of the transmitted message in the power line 78 is about the same as the embodiment of FIG. 1 even through the 24 V. supply is approximately one sixth of the +150 V. supply in the embodiment of FIG. 1. The LED 348 will indicate the periods during which the device 80 is transmitting a message to the network 78.

Figure 3:
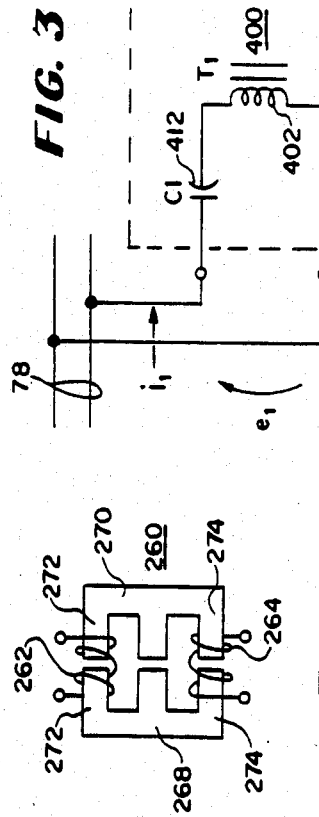
FIG. 3 is a schematic diagram of the preferred embodiment of the coupling circuit of the present invention wherein a coupling transformer having three windings is employed.
Figure 4:
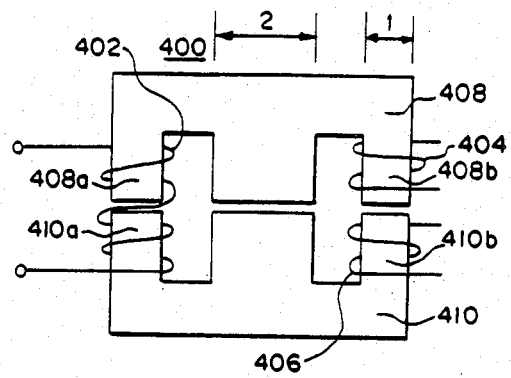
FIG. 4 is a diagram showing the physical construction of the coupling transformer of FIG. 3.

In FIG. 3 the preferred embodiment of the coupling circuit of the present invention is shown which may be employed in communication and control systems which have a large number of controlled units (stand alone slave or expanded mode slave), the coupling circuits of all of these controlled units being connected in parallel across the common power lines 78. In the embodiment of FIG. 3 a substantially higher input impedance is provided for improved reception and a higher output voltage is provided for improved transmission onto the common power line 78. Referring to this figure, the coupling circuit 90A shown therein employs a coupling transformer 400 having a primary winding 402, a receive secondary winding 404 and a transmit secondary winding 406. The coupling transformer 400 employs the opposed E-shaped core sections 408 and 410, (FIG. 4) of ferrite material, the primary winding 402 being wound on one of the outer legs 408a, 410a, and the secondary windings 404 and 406 being wound on the other outer legs 408b and 410b, respectively, of the core sections 408 and 410. The center legs of the core sections 408 and 410 function as a magnetic shunt between the primary and secondary windings which decouples these windings by shunting approximately two thirds of the primary flux from the secondary winding, and vice versa. While such a 33% coupling would be considered to be poor coupling from a power transformer standpoint, this amount of coupling is sufficient to provide an overcoupled band pass characteristic when the coupling transformer 400 is viewed as a tuned communication type device which is suitable for selectively receiving and transmitting signals at a carrier frequency of 115.2 kHz.

Figure 5:
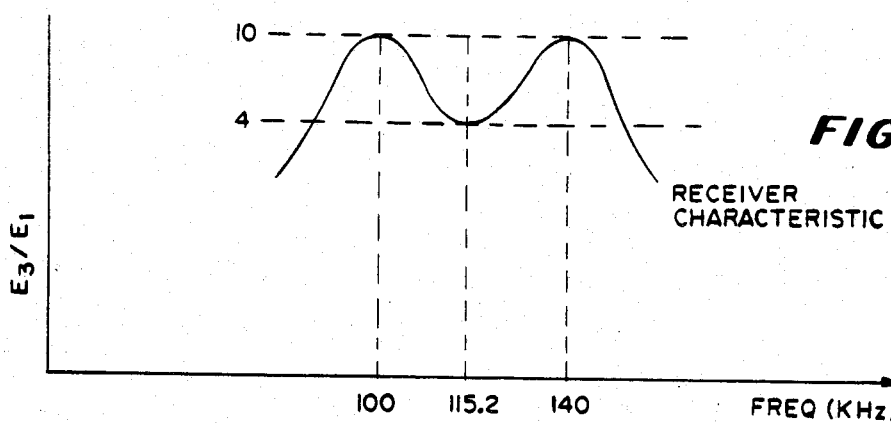
FIGS. 5, 6 and 7 are graphs illustrating certain operating characteristics of the coupling transformer of FIGS. 3 and 4.

The primary winding 402 is tuned to the carrier frequency by means of the capacitor 412 and the transmit secondary winding 406 is also tuned to the carrier frequency by means of the capacitor 414. The above described overcoupling in the transformer 400 results in a double tuned receiver characteristic of the type shown in FIG. 5 wherein the gain of the coupling transformer 400 is approximately 4 at the carrier frequency of 115.2 kHz. and is approximately 10 at the two off center peaks of the double tuned characteristic at 100 kHz. and 140 kHz., respectively. In this connection, it is noted that the receiver characteristic shown in FIG. 5 is the ratio of the voltage developed across the receiver secondary winding 404 ($E_3$) to the voltage developed across the power line 78 ($E_1$).

The secondary windings 404 and 406 are wound on the same core leg and hence are tightly coupled. However, the use of separate secondary windings permits the transmitter winding 406 to be referenced to the +V power supply while at the same time the receiver secondary winding 404 can be referenced to ground. More particularly, the upper end of the transmitter secondary winding 406 is connected to a positive voltage supply, which may comprise a 20 volt DC voltage source, the bottom end of the winding 406 being connected through the series resistor 416 to the drain electrode of an FET 418 the source of which is connected to ground. Preferably, the FET is a power FET commercial type 2N6660. The gate of the FET 418 is connected to ground through the diode 420 and through the capacitor 422 to the TX terminal of the device 80, as described in more detail in connection with the embodiments of FIGS. 1 and 2.

The bottom end of the receive secondary winding 404 is connected to ground and the upper end of this winding is connected through a resistor 424 to one input of the comparator 300. A feedback resistor 426 is connected from the output of the comparator 300 to this same input, the resistor 424 acting as a part of the voltage divider to provide the desired small amount of positive feedback to provide a dead band, as described heretofore in connection with FIG. 1. However, it will be noted that in the embodiment of FIG. 3 the resistor 424 is connected in series with the receive secondary coil 404 and hence does not load the secondary winding 404. It will also be understood that the diodes 286 and 288 do not conduct in the absence of relatively large signals applied to the input of the comparator 300 and hence the only load across the winding 404 is the series combination of the resistors 424, 426 and 302 which is extremely high. In the embodiment of FIG. 1 wherein only the single secondary winding 264 is employed, it is necessary to isolate the input of the comparator 300 from the plus voltage supply by means of the capacitor 284 which in turn requires that a resistance be added to ground on the comparator side of the capacitor 284, i.e., the resistor 296, in order to complete the DC feedback path for the positive feedback circuit of the comparator 300. It will also be noted that in the embodiment of FIG. 3 the filter 292, 294 and 298 of FIG. 1 has been eliminated.

Figure 6:
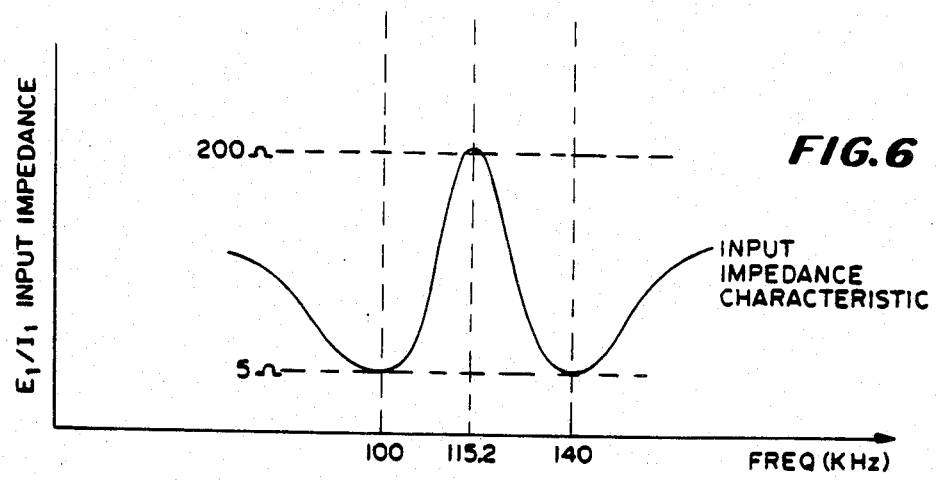

The fact that there is very little loading on the secondary receive winding 404 in the embodiment of FIG. 3 means that the input impedance of the coupling transformer 400, as seen from the power line 78 is very high. Thus, as shown in FIG. 6 the input impedance of the coupling transformer 400 is greater than 200 ohms at the carrier frequency of 115.2 kHz. With a receiver sensitivity of approximately 10 millivolts, this results in an input current requirement for each coupling circuit 90A of the type shown in FIG. 3 of less than 10 mv/200 ohms i.e., 50 microamperes. The coupling circuit 90A of FIG. 3 is arranged to provide an output voltage of 2.5 volts rms across a 10 ohm impedance, which corresponds to a transmitter output current of 250 milliamperes. Furthermore, this current will increase slightly as the transmitter load resistance decreases. Accordingly, the total number of receivers which the transmitter circuit of the coupling circuit 90A can supply, ignoring other transmission losses, is thus 250 milliamperes/50 microamperes = 5,000 receivers. This figure is somewhat larger than the 4,096 address capability of the digital IC 80, described in the above identified cross referenced applications, which employs a 12 bit address format.

It will be noted from the input impedance characteristic shown in FIG. 6 that the input impedance of the coupling circuit 90A is very low, i.e. on the order of 5 ohms, at points corresponding to the offset peaks of the double tuned receiver characteristic shown in FIG. 5. Accordingly, even though the gain of the coupling transformer 400 is higher at these offset peaks, the extremely low input impedance at these points causes the coupling circuit 90a to act as a resonant trap circuit at these frequencies which will absorb undesired signals whose frequencies are near to the carrier frequency.

Figure 8:
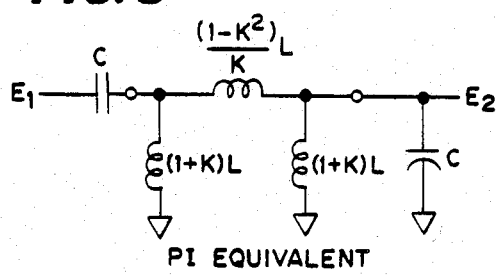
FIGS. 8 and 9 are circuit diagrams showing the pi equivalent circuit and T-equivalent circuit, respectively, of the coupling transformer of FIGS. 3 and 4.
Figure 9:
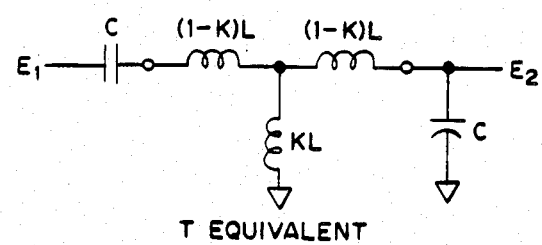

The unique shape of the input impedance characteristic shown in FIG. 6 can best be explained by referring to the pi equivalent circuit of the coupling transformer 400 shown in FIG. 8 and the T equivalent circuit of this transformer shown in FIG. 9. In these figures the pi and T equivalent circuits are shown in conjunction with both the primary and secondary tuning capacitors. Preferably the primary winding 402 and the transmitter secondary winding 406 have the same number of turns and hence the tuning capacitors 412 and 414 will have the same value, identified as the capacitors C in FIGS. 8 and 9. However, it will be understood that different primary/secondary turns ratios may be employed, as described heretofore in connection with FIGS. 1 and 2, in which case these capacitors will vary as the square of the turns ratio between the windings 402 and 406.

The parameters L and K employed in the pi and T equivalent circuits of FIGS. 8 and 9 represent the open circuit characteristic of the coupling transformer 400. More particularly L is the inductance of a given winding with the other winding open circuited and K is the ratio of the output voltage divided by the input voltage under the same condition. Utilizing the equivalent circuits of FIGS. 8 and 9, the resonant frequencies associated with both the receive and transmit mode of the coupling transformer 400 can be determined and expressed in terms of K and L.

The two resonant peaks of the double tuned receiver characteristic of FIG. 5 are produced by the series resonance of the input capacitor C with either the shunt input inductance $(1+K)L$ of the pi equivalent circuit of FIG. 8 or the series input inductance $(1-K)L$ of the T equivalent circuit of FIG. 9. In this connection it will be noted that in FIG. 9 the second series leg $(1-K)L$ is also series resonant with the secondary tuning capacitor C and this series resonant circuit is a low impedance across the shunt leg KL of the T equivalent circuit at the resonant frequency.

If the carrier frequency is defined as:

$$f_c = \frac{1}{2\pi \sqrt{LC}}$$

then these two series resonant frequencies become:

$$f_L = \frac{1}{\sqrt{1+K}} f_c$$

$$f_H = \frac{1}{\sqrt{1-K}} f_c$$

where $f_L$ and $f_H$ correspond to the low and high resonant frequencies respectively. Utilizing a coupling coefficient of $K=0.33$ and a carrier frequency of 115.2 kHz, yields $f_L=100$ kHz and $f_H=140$ kHz, corresponding to the two peaks of the characteristic shown in FIG. 5. The existence of these series resonant peaks provides the low impedance (5 ohm) points of the input impedance characteristic of FIG. 6 at which points the coupling circuit 90A acts as a resonant trap circuit to absorb signals of these frequencies.

Figure 10:
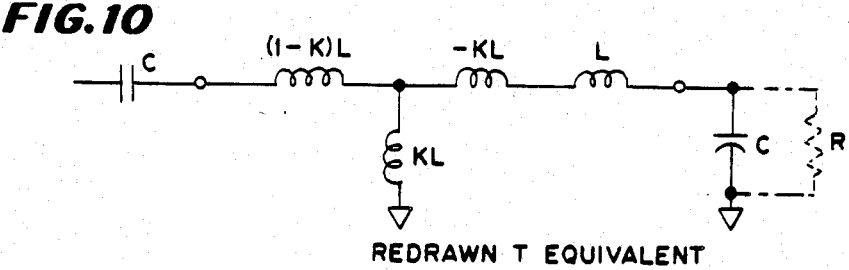
FIGS. 10-13, inclusive are circuit diagrams used to explain the operation of the coupling circuit of FIG. 3 of the present invention.
Figure 11:
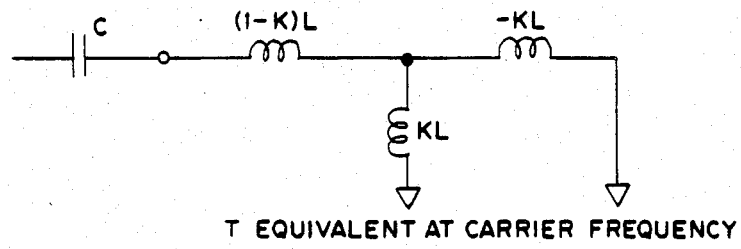

The manner in which a high input impedance at the carrier frequency is achieved (greater than 200 ohms in the input impedance characteristic of FIG. 6) can be seen from an examination of the T equivalent circuit of FIG. 9 which can be redrawn as shown in FIG. 10 to show two separate inductances $-KL$ and L in the right hand series leg of the T. At the carrier frequency L and C are series resonant so that the circuit becomes as shown in FIG. 11 wherein the inductance $-KL$ is connected in parallel with the shunt leg KL. The parallel combination of KL and $-KL$ represents a parallel resonant condition of high impedance which is reflected into the primary winding 402 as a high impedance so that the coupling circuit 90A as seen from the power line 78 has an input impedance of over 200 ohms. This high input impedance is achieved by employing the separate receive secondary winding 404 which is essentially unloaded so that the loading on the series resonant LC circuit of FIG. 10, indicated by the resistor R shown in dotted lines in this figure, is relatively high and permits the series resonant LC circuit to act as a short circuit, as shown in FIG. 11.

Figure 7:
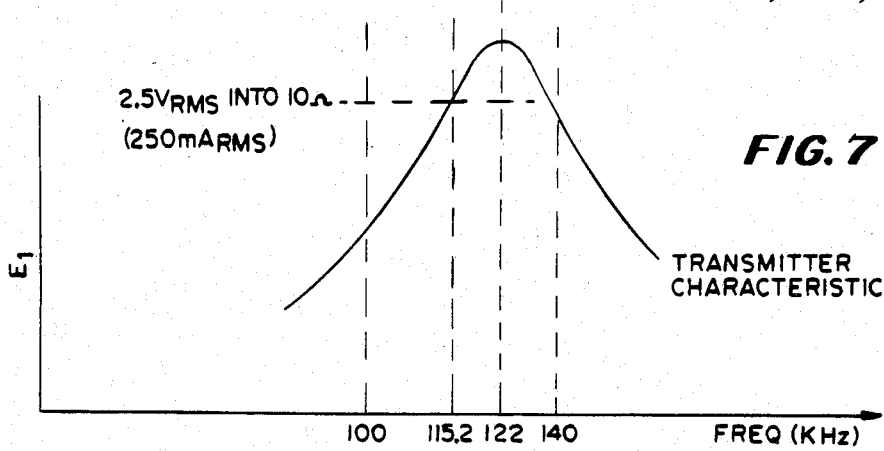
Figure 12:
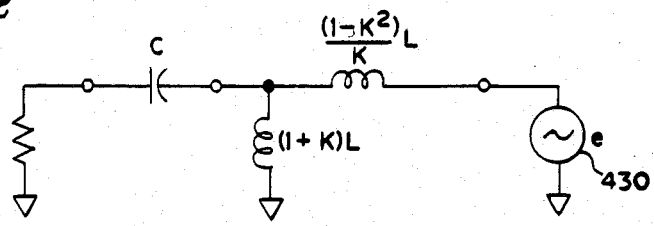
Figure 13:
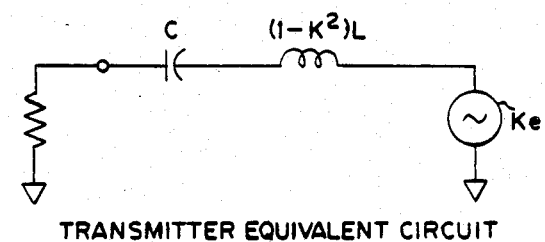

Considering now the transmitter characteristic of the coupling circuit 90A shown in FIG. 7, it will be noted that this characteristic is peaked at a frequency of 122 kHz. which is offset somewhat from the carrier frequency of 115.2 kHz. However, at the carrier frequency the transmitter characteristic still has a substantial amplitude, sufficient to produce 2.5 volts rms across the power line 78. In considering the manner in which this offset of the transmitter characteristic arises, it will first be noted that the FET 418 is essentially directly connected to the transmitter secondary winding 406 since the series resistor 416 is of very low resistance, in the order of 10 ohms. Accordingly, the pi equivalent circuit of FIG. 8 is modified to the equivalent circuit shown in FIG. 12 during periods when the FET 418 is conducting and presents an extremely low impedance, indicated by the generator 430 shown in FIG. 12, which has a low internal resistance such that it swamps out the parallel resonant circuit consisting of the right hand shunt leg of the pi equivalent circuit of FIG. 8 and the tuning capacitor C connected across this leg. By using Thevenin's theorem the circuit of FIG. 12 may be redrawn to provide the equivalent generator circuit shown in FIG. 13 wherein the primary tuning capacitor C is connected in series with the single inductance having a value of $(1-K^2)L$. The equivalent circuit of FIG. 13 shows that during the transmitter mode, the coupling transformer 400 is peaked at a frequency, $f_p$, at which:

$$f_p = \frac{1}{\sqrt{1-K^2}} f_c$$

For a coupling coefficient K of 0.33 and a carrier frequency $f_c$ of 115.2 kHz, the transmission peak frequency $f_p$ thus becomes 122 kHz, as shown in FIG. 7.

From the foregoing, it will be seen that the coupling circuit of the present invention, particularly the preferred embodiment of FIG. 3 thereof, provides a high input impedance for the reception of signals during the receive mode, so that a large number of such coupling circuits may be connected in parallel across the common power line and receive network messages. Also the sensitivity to received signals is high due to the gain achieved through the coupling transformer and the extremely high gain of the comparator 300 so that a receive signal at the required level of 5 volts is available for the digital IC 80. In addition, high selectivity is achieved during the receive mode due to the trapping action of the low impedance points on the input impedance characteristic of FIG. 6 at frequencies relatively close to the carrier frequency.

During the transmit mode a high output is achieved by directly connecting the transmit winding across a DC voltage supply by rendering conductive a transistor or FET connected in series therewith, so that the power line can be driven in the current mode to provide for the transmission of signals to a large number of similar coupling circuits connected to the common power line. The coupling circuit of the present invention is also of high efficiency due to the fact that it employs resonant circuits which are tuned to the carrier frequency and are driven in an efficient manner. Furthermore, these resonant circuits provide low distortion of the transmitted signal since they tend to filter out harmonics and other high frequency signals which might cause interference, such as signals in the radio band. The coupling circuit of the present invention is also capable of operation continually with either an open circuit or shorted condition on the power line 78 since such conditions do not result in damage to any of the components of the coupling circuit. Furthermore the coupling circuit of the present invention is relatively immune to damage from electrical voltage transients due to the isolation provided by the coupling transformer 260 or 400 which can be made to withstand a 4-5 kilovolt pulse by appropriate spacing and insulation between the primary and secondary windings thereof.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. A bidirectional coupling circuit for use in a communication and control system in which high frequency carrier signals are transmitted in both directions over a common network line, comprising a transformer having first and second windings and core means for inductively coupling said windings, means connecting said first winding to said common network line, means for tuning said first and second windings to the frequency of said high frequency carrier, amplifier means connected to said second winding for amplifying a high frequency signal received over said common network line, and driver means connected to said second winding and supplying a high frequency carrier signal thereto for transmission over said common network line, said driver means comprising a high voltage NPN transistor connected in series with said second winding to a dc voltage source in the order of 150 volts and having a control element, and means connected to said control element for rendering said high voltage NPN transistor conductive at said high frequency carrier rate.

2. A bidirectional coupling circuit as set forth in claim 1, wherein said first and second windings have a turns ratio of 1:6.

3. A bidirectional coupling circuit for use in a communication and control system in which high frequency carrier signals are transmitted in both directions over a common network line, comprising a transformer having first and second windings and core means for inductively coupling said windings, means connecting said first winding to said common network line, means for tuning said first and second windings to the frequency of said high frequency carrier, amplifier means connected to said second winding for amplifying a high frequency signal received over said common network line, and driver means connected to said second winding and supplying a high frequency carrier signal thereto for transmission over said common network line, said driver means comprising a field effect transistor connected in series with said second winding to a dc voltage source in the order of 20 volts and having a control element, and means connected to said control element for rendering said field effect transistor conductive at said high frequency carrier rate wherein said first and second windings have the same number of turns.

4. A bidirectional coupling circuit for use in a communication and control system in which high frequency carrier signals are transmitted in both directions over a common network line, comprising a transformer having first and second windings and core means for inductively coupling said windings, said core means comprising a pair of opposed, E-shaped core sections of ferrite material and having an air gap between the opposed leg portions thereof, means connecting said first winding to said common network line, means for tuning said first and second windings to the frequency of said high frequency carrier, amplifier means connected to said second winding for amplifying a high frequency signal received over said common network line, and drive means connected to said second winding and supplying a high frequency carrier signal thereto for transmission over said common network line.

5. A bidirectional coupling circuit as set forth in claim 4, wherein said air gap is of the order of 63 mils.

6. A bidirectional coupling circuit as set forth in claim 4, wherein said first winding is wound on one outer leg of said E shaped core sections and said second winding is wound on the other outer leg of said E shaped core sections.

7. A bidirectional coupling circuit for use in a communication and control system in which high frequency carrier signals are transmitted in both directions over a common network line, comprising a transformer having first and second windings and core means for inductively coupling said windings, means connecting said first winding to said common network line, means for tuning said first and second windings to the frequency of said high frequency carrier, amplifier means connected to said second winding for amplifying a high frequency signal received over said common network line, wherein said amplifier means includes operational amplifier means having one input connected to said second winding and another input connected to a point of fixed potential, said operational amplifier developing a received carrier signal of predetermined amplitude in the output thereof in response to a signal developed across said second winding of predetermined minimum signal strength, and driver means connected to said second winding for supplying a high frequency carrier signal thereto for transmission over said common network line.

8. A bidirectional coupling circuit as set forth in claim 7, wherein said operational amplifier has sufficient gain to develop an output signal of approximately 5 volts amplitude in response to a signal in the order of 40 millivolts across said second winding.

9. A bidirectional coupling circuit as set forth in claim 8, wherein said operational amplifier also limits the amplitude of noise impulse signals impressed upon said one input to said 5 volt output signal amplitude.

10. A bidirectional coupling circuit as set forth in claim 7, which includes positive feedback means connected between the output of said operational amplifier means and said one input, thereby to provide a dead band for suppression of input signals of small amplitude supplied to said one input.

11. In a communication and control system of the type in which two way communication between a master controller and a plurality of remote stations is accomplished by means of on-off keyed carrier signals transmitted over a common network line, each of said remote stations including a digital logic device adapted to demodulate a received on-off keyed carrier signal of predetermined amplitude and also adapted to develop an on-off keyed carrier transmitter output signal of predetermined amplitude for transmission over said common network line, a bidirectional coupling circuit connected between each of said digital logic devices and said common network line, each of said coupling circuits including a transformer having a primary winding a secondary winding and core means for loosely coupling said primary and secondary windings, a capacitor, means connecting said capacitor and said primary winding in series and connecting the series combination thereof across said common network line, said capacitor and said primary winding comprising a series resonant circuit tuned to the frequency of said carrier signals, amplifier means having an input connected to said secondary winding and arranged to amplify an on-off keyed carrier signal received over said common network line to provide a received signal of said predetermined amplitude, and driver means for supplying said transmitter output signal to said secondary winding, said secondary winding being sufficiently decoupled from said primary winding that the damping effect of said secondary winding on said series resonant circuit is relatively small during transmission of said transmitter output signal over said common network line.

12. In a communication and control system of the type in which two-way communication between a master controller and a plurality of remote stations is accomplished by means of high frequency carrier signals transmitted over a common network line, the combination of, means at each of said remote stations for transmitting plural bit high frequency carrier messages to and receiving plural bit high frequency carrier messages from said common network line, a bidirectional coupling circuit connecting said transmitting and receiving means of each of said remote stations to said common network line, each of said coupling circuits including tuned circuit means connected to said common network line and resonant at the frequency of said carrier signals, said tuned circuit means having a high input impedance at said carrier frequency and having a low impedance at frequencies spaced on either side of said carrier frequency to minimize reception of signals on either side of said carrier frequency.

13. The combination of claim 12, wherein said tuned circuit means comprises a series resonant circuit the series combination of which is connected across said common network line.

14. The combination of claim 12, wherein said tuned circuit means includes the primary winding of a transformer which is connected in series with a capacitor, the series combination of said primary winding and said capacitor being connected across said common network line, said transformer having at least one additional winding connected to said transmitting and receiving means of the remote station.

15. The combination of claim 12 wherein said tuned circuit means includes the primary winding of a transformer which is connected in series with a capacitor, the series combination of said primary winding and said capacitor being connected across said common network line, a transistor connected in series with the secondary winding of said transformer to a dc voltage source and having a control element, and means connecting said control element to said transmitting means to that said transistor is rendered conductive at the frequency of said high frequency carrier.

16. The combination of claim 12, wherein said tuned circuit means has an impedance in the order of 200 ohms at said carrier frequency.

17. The combination of claim 12, wherein said tuned circuit means has an impedance in the order of 5 ohms at said frequencies spaced on either side of said carrier frequency.

18. A bidirectional coupling circuit for use in a communication and control system in which high frequency carrier signals are transmitted in both directions over a common network line, comprising a transformer having first, second and third windings and core means for inductively coupling said windings, said first and said second windings having the same number of turns, means connecting said first winding to said common network line, means for tuning said first and second windings to the frequency of said high frequency carrier, amplifier means connected to said third winding for amplifying a high frequency signal received over said common network line, and driver means connected to said second winding and supplying a high frequency carrier signal thereto for transmission over said common network line, said driver means comprising a field effect transistor connected in series to said second winding to a dc voltage source in the order of 20 volts and having a control element, and means connected to said control element for rendering said field effect transistor conductive at said high frequency carrier rate.

19. A bidirectional coupling circuit for use in a communication and control system in which high frequency carrier signals are transmitted in both directions over a common network line, comprising a transformer means having first, second and third windings and core means for inductively coupling said windings, said core means comprising a pair of opposed, E-shaped core sections of ferrite material and having an air gap between the opposed leg portions thereof, means connecting said first winding to said common network line, means for tuning said first and second windings to the frequency of said high frequency carrier, amplifier means connected to said third winding for amplifying a high frequency signal received over said common network line, and driver means connected to said second winding and supplying a high frequency carrier signal thereto for transmission over said common network line.

20. A bidirectional coupling circuit as set forth in claim 19, wherein said air gap is of the order of 0.063 inches.

21. A bidirectional coupling circuit as set forth in claim 19, wherein said first winding is wound on one outer leg of said E shaped core sections and said second and third windings are wound on the other outer leg of said E shaped core sections.

22. A bidirectional coupling circuit for use in a communication and control system in which high frequency carrier signals are transmitted in both directions over a common network line, comprising a transformer having first, second and third windings and core means for inductively coupling said windings, means connecting said first winding to said common network line, means for tuning said first and second windings to the frequency of said high frequency carrier, amplifier means connected to said third winding for amplifying a high frequency signal received over said common network line, said amplifier means including operational amplifier means having one input connected in series with said third winding and another input connected to a point of fixed potential, said operational amplifier developing a received carrier signal of predetermined amplitude in the output thereof in response to a signal developed across said third winding of predetermined minimum signal strength, and driver means connected to said second winding and supplying a high frequency carrier signal thereto for transmission over said common network line.

23. A bidirectional coupling circuit as set forth in claim 22, wherein said operational amplifier has sufficient gain to develop an output signal of approximately 5 volts amplitude in response to a signal in the order of 40 millivolts on said one input.

24. A bidirectional coupling circuit as set forth in claim 22, which includes positive feedback means connected between the output of said operational amplifier means and said one input, thereby to provide a dead band for suppression of input signals of small amplitude supplied to said one input.

25. A bidirectional coupling ciruit as set forth in claim 24, wherein said positive feedback means includes a first resistor connected between the output of said operational amplifier means and said one input, and a second resistor connected in series with said third winding to said one input.

26. In a communication and control system of the type in which two-way communication between a master controller and a plurality of remote stations is accomplished by means of high frequency carrier signals transmitted over a common network line, the combination of, means at each of said remote stations for transmitting plural bit high frequency carrier messages to and receiving plural bit high frequency carrier messages from said common network line, a bidirectional coupling circuit connecting said transmitting and receiving means of each of said remote stations to said common network line, each of said coupling circuits having a high input impedance at said carrier frequency and having a low input impedance at frequencies spaced on either side of said carrier frequency to minimize reception of signals on either side of said carrier frequency.

27. The combination of claim 26, wherein each of said coupling circuits has an input impedance in the order of 200 ohms at said carrier frequency.

28. The combination of claim 26, wherein each of said coupling circuits has an input impedance in the order of 5 ohms at said frequencies spaced on either side of said carrier frequency.

29. The combination of claim 26, wherein each of said coupling circuits includes a transformer having first, second and third windings and core means for inductively coupling said windings, means for tuning said first and second windings to the frequency of said carrier signals, said core means comprising a pair of E-shaped core sections, said core sections being positioned with the legs thereof in opposed relation, said first winding being wound on one outer leg of said core sections and said second and third windings being wound on the other outer leg of said core sections.

30. The combination of claim 29, wherein the center legs of said E-shaped core sections provide a magnetic shunt which prevents approximately two thirds of the magnetic flux developed by said first winding from being coupled to said second and third windings.

31. The combination of claim 29, wherein said E-shaped core sections together occupy approximately the space of a one half inch cube.

32. The combination of claim 29, wherein said core sections are made of ferrite material.

* * * * *